(12) United States Patent
Czeskis et al.

(10) Patent No.: US 10,402,294 B1
(45) Date of Patent: Sep. 3, 2019

(54) METHODS AND SYSTEMS OF DIFFERENTIATING BETWEEN AT LEAST TWO PERIPHERAL ELECTRONIC DEVICES

(71) Applicant: Google LLC, Mountain View, CA (US)

(72) Inventors: Alexei Czeskis, Mountain View, CA (US); Michal Levin, Mountain View, CA (US); Josh Woodward, Mountain View, CA (US); Nishit Shah, Mountain View, CA (US)

(73) Assignee: Google LLC, Mountain View, CA (US)

( * ) Notice: Subject to any disclaimer, the term of this patent is extended or adjusted under 35 U.S.C. 154(b) by 64 days.

(21) Appl. No.: 14/309,176

(22) Filed: Jun. 19, 2014

(51) Int. Cl.
*G06F 11/30* (2006.01)

(52) U.S. Cl.
CPC ................. *G06F 11/3051* (2013.01)

(58) Field of Classification Search
None
See application file for complete search history.

(56) References Cited

U.S. PATENT DOCUMENTS

| | | | |
|---|---|---|---|
| 6,591,279 B1* | 7/2003 | Emens et al. | |
| 6,711,162 B1* | 3/2004 | Ortega | H04L 29/06 370/389 |
| 8,648,799 B1 | 2/2014 | Lloyd | |
| RE44,814 E * | 3/2014 | Perholtz | 379/38 |
| 8,850,340 B2* | 9/2014 | Lee | G06F 1/1624 715/764 |
| 2003/0159059 A1* | 8/2003 | Rodriquez et al. | 713/200 |
| 2004/0258274 A1* | 12/2004 | Brundage | G07D 7/128 382/100 |
| 2005/0066000 A1* | 3/2005 | Liaw | G06F 13/385 709/204 |
| 2005/0144251 A1* | 6/2005 | Slate | H04L 29/06 709/215 |
| 2006/0015734 A1* | 1/2006 | Atobe | G06F 21/10 713/176 |
| 2006/0031447 A1* | 2/2006 | Holt | H04L 12/24 709/223 |
| 2007/0022176 A1* | 1/2007 | Kobayashi | H04L 12/12 709/217 |
| 2007/0024643 A1* | 2/2007 | Naya | G06F 3/1454 345/629 |
| 2007/0236453 A1* | 10/2007 | Maynard | G06F 17/2211 345/158 |
| 2007/0300063 A1* | 12/2007 | Adams | G06F 21/35 713/168 |

(Continued)

*Primary Examiner* — Henry Tsai
*Assistant Examiner* — Christopher A Bartels
(74) *Attorney, Agent, or Firm* — Lerner, David, Littenberg, Krumholz & Mentlik, LLP (57) ABSTRACT

In an embodiment, a method of differentiating between at least two peripheral electronic devices may include, by a primary electronic device, receiving a request from a user to identify a desired peripheral electronic device associated with the user, identifying a plurality of peripheral electronic devices associated with the user, receiving an image associated with each of the identified peripheral electronic devices, displaying one or more of the received images, receiving a selection of one of the displayed images, identifying the peripheral electronic device associated with the selected displayed image as the desired peripheral electronic device, and causing one or more settings of the desired peripheral electronic device to be changed.

29 Claims, 8 Drawing Sheets

(56) References Cited

U.S. PATENT DOCUMENTS

| | | | | |
|---|---|---|---|---|
| 2009/0024847 A1* | 1/2009 | Sun | ............... | G06F 21/6209 |
| | | | | 713/165 |
| 2010/0248681 A1* | 9/2010 | Phills | ............... | G08B 27/005 |
| | | | | 455/404.2 |
| 2011/0055834 A1* | 3/2011 | Meda et al. | ............... | 718/101 |
| 2011/0102588 A1* | 5/2011 | Trundle et al. | ............... | 348/143 |
| 2011/0246892 A1* | 10/2011 | Hedges | ............... | G11B 27/034 |
| | | | | 715/723 |
| 2012/0078402 A1* | 3/2012 | Crockett | ............... | G06F 9/4881 |
| | | | | 700/94 |
| 2012/0210245 A1* | 8/2012 | McCoy | ............... | H04N 21/47 |
| | | | | 715/747 |
| 2012/0236201 A1* | 9/2012 | Larsen et al. | ............... | 348/468 |
| 2013/0035143 A1* | 2/2013 | Izutsu | ............... | G06F 1/1632 |
| | | | | 455/566 |
| 2013/0215266 A1* | 8/2013 | Trundle et al. | ............... | 348/143 |
| 2014/0101562 A1* | 4/2014 | Yao | ............... | H04L 67/06 |
| | | | | 715/738 |
| 2014/0118239 A1* | 5/2014 | Phillips | ............... | G06F 9/4445 |
| | | | | 345/156 |
| 2014/0173072 A1* | 6/2014 | Chandrasekhar | ............... | G06F 9/00 |
| | | | | 709/223 |
| 2014/0270722 A1* | 9/2014 | Wang et al. | ............... | 386/355 |
| 2014/0333413 A1* | 11/2014 | Kursun | ............... | 340/5.52 |
| 2015/0339216 A1* | 11/2015 | Wade | ............... | G06F 11/3688 |
| | | | | 714/38.1 |
| 2019/0026212 A1* | 1/2019 | Verkasalo | ............... | G06F 11/3438 |

\* cited by examiner

METHODS AND SYSTEMS OF DIFFERENTIATING BETWEEN AT LEAST TWO PERIPHERAL ELECTRONIC DEVICES

BACKGROUND

This disclosure is generally directed to methods and systems for differentiating devices that are associated with a single user account. Users often don't name their personal electronic devices, which makes it difficult for technology companies to present users with meaningful information about a specific device. In certain situations, a user may use a dashboard or other computer interface of a primary device to access information about one of the user's peripheral electronic devices. For instance, a user may use a laptop computer to access or change settings of the user's tablet. The problem is further exacerbated when users have multiple similar devices, for example two mobile phones.

Asking users to name devices is often an inadequate solution. This request is not user friendly, and typically results in users forgetting the names that they were required to provide. Even if users do name their devices, those names are often not prominently displayed.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a method of differentiating between at least two peripheral electronic devices may include, by a primary electronic device, receiving a request from a user to identify a desired peripheral electronic device associated with the user, identifying a plurality of peripheral electronic devices associated with the user, receiving an image associated with each of the identified peripheral electronic devices, displaying one or more of the received images, receiving a selection of one of the displayed images, identifying the peripheral electronic device associated with the selected displayed image as the desired peripheral electronic device, and causing an action to be taken with respect to the identified peripheral electronic device.

In an embodiment, a method of differentiating between at least two peripheral electronic devices may include, by a primary electronic device, receiving a request from a user to identify a desired peripheral electronic device associated with the user, identifying a plurality of peripheral electronic devices associated with the user, causing one or more of the peripheral electronic devices to perform one or more actions, in response to causing one or more of the identified peripheral electronic devices to perform one or more actions, receiving a selection of one of the peripheral electronic devices from the user, identifying the selected peripheral electronic device as the desired peripheral electronic device, and causing a second action to be taken with respect to the identified peripheral electronic device.

In an embodiment, a method of differentiating between at least two peripheral electronic devices may include, by a primary electronic device, receiving a request from a user to identify a desired peripheral electronic device associated with the user, identifying a plurality of peripheral electronic devices associated with the user, activating a camera associated with the primary electronic device, receiving image data from the camera, analyzing the image data to determine which of the identified peripheral electronic devices is in closest proximity to the user, identifying the peripheral electronic device that is in closest proximity to the user as the desired peripheral electronic device, and causing an action to be taken with respect to the identified peripheral electronic device.

In an embodiment, a method of differentiating between at least two peripheral electronic devices may include, by a primary electronic device receiving a request from a user to identify a desired peripheral electronic device associated with the user, identifying a plurality of peripheral electronic devices associated with a user, analyzing one or more behavioral patterns associated with each identified peripheral electronic device, selecting one of the identified peripheral electronic devices as the desired peripheral electronic device based on the analysis; and causing cause an action to be taken with respect to the desired peripheral electronic device.

In an embodiment, a method of differentiating between at least two peripheral electronic devices may include, by a primary electronic device, receiving a request from a user to identify a desired peripheral electronic device associated with the user, identifying a plurality of peripheral electronic devices associated with the user, instructing the user to perform an action using the desired peripheral electronic device, detecting which of the plurality of peripheral electronic devices performs the action, identifying the peripheral electronic device that performs the action as the desired peripheral electronic device, and causing an action to be taken with respect to the identified peripheral electronic device.

In an embodiment, a system of differentiating between at least two peripheral electronic devices may include a primary electronic device and a computer-readable storage medium in communication with the primary electronic device. The computer-readable storage medium may include one or more programming instructions that, when executed, cause the primary electronic device to receive a request from a user to identify a desired peripheral electronic device associated with the user, identify a plurality of peripheral electronic devices associated with the user, receive an image associated with each of the identified peripheral electronic devices, display one or more of the received images, receive a selection of one of the displayed images, identify the peripheral electronic device associated with the selected displayed image as the desired peripheral electronic device, and cause an action to be taken with respect to the identified peripheral electronic device.

In an embodiment, a system of differentiating between at least two peripheral electronic devices may include a primary electronic device and a computer-readable storage medium in communication with the primary electronic device. The computer-readable storage medium may include one or more programming instructions that, when executed, cause the primary electronic device to receive a request from a user to identify a desired peripheral electronic device associated with the user, identify a plurality of peripheral electronic devices associated with the user, cause one or more of the peripheral electronic devices to perform one or more actions, in response to causing one or more of the identified peripheral electronic devices to perform one or more actions, receive a selection of one of the peripheral electronic devices from the user, identify the selected peripheral electronic device as the desired peripheral electronic device; and cause a second action to be taken with respect to the identified peripheral electronic device.

In an embodiment, a system of differentiating between at least two peripheral electronic devices may include a primary electronic device and a computer-readable storage medium in communication with the primary electronic device. The computer-readable storage medium may include one or more programming instructions that, when executed, cause the primary electronic device to receive a request from a user to identify a desired peripheral electronic device associated with the user, identify a plurality of peripheral electronic devices associated with the user, activate a camera associated with the primary electronic device, receive image data from the camera, analyze the image data to determine which of the identified peripheral electronic devices is in closest proximity to the user, identify the peripheral electronic device that is in closest proximity to the user as the desired peripheral electronic device, and cause an action to be taken with respect to the identified peripheral electronic device.

In an embodiment, a system of differentiating between at least two peripheral electronic devices may include a primary electronic device and a computer-readable storage medium in communication with the primary electronic device. The computer-readable storage medium may include one or more programming instructions that, when executed, cause the primary electronic device to receive a request from a user to identify a desired peripheral electronic device associated with the user, identify a plurality of peripheral electronic devices associated with a user, analyze one or more behavioral patterns associated with each identified peripheral electronic device, select one of the identified peripheral electronic devices as the desired peripheral electronic device based on the analysis, and cause an action to be taken with respect to the desired peripheral electronic device.

In an embodiment, a system of differentiating between at least two peripheral electronic devices may include a primary electronic device and a computer-readable storage medium in communication with the primary electronic device. The computer-readable storage medium may include one or more programming instructions that, when executed, cause the primary electronic device to receive a request from a user to identify a desired peripheral electronic device associated with the user, identify a plurality of peripheral electronic devices associated with the user, instruct the user to perform an action using the desired peripheral electronic device, detect which of the plurality of peripheral electronic devices performs the action, identify the peripheral electronic device that performs the action as the desired peripheral electronic device, and cause an action to be taken with respect to the identified peripheral electronic device.

DETAILED DESCRIPTION

The following terms shall have, for purposes of this application, the respective meanings set forth below:

An "electronic device" refers to a device that includes a processor and tangible, computer-readable memory. The memory may contain programming instructions that, when executed by the processor, cause the electronic device or electronic device to perform one or more operations according to the programming instructions. Examples of electronic devices include personal computers, servers, mainframes, gaming systems, televisions, and portable electronic devices such as smartphones, personal digital assistants, cameras, tablet computers, laptop computers, media players and the like. When used in the claims, reference to "an electronic device" may include a single device, or it may refer to any number of devices having one or more processors that communicate with each other and share data and/or instructions to perform the claimed steps.

A "peripheral electronic device" refers to an electronic device that is able to perform an action as directed by a primary electronic device.

A "primary electronic device" refers to an electronic device having a graphical user interface that may be used to cause a peripheral electronic device to perform an action.

A "user account" refers to an application or other protected resource that is accessible via one or more credentials such as, for example, a password.

Figure 1:
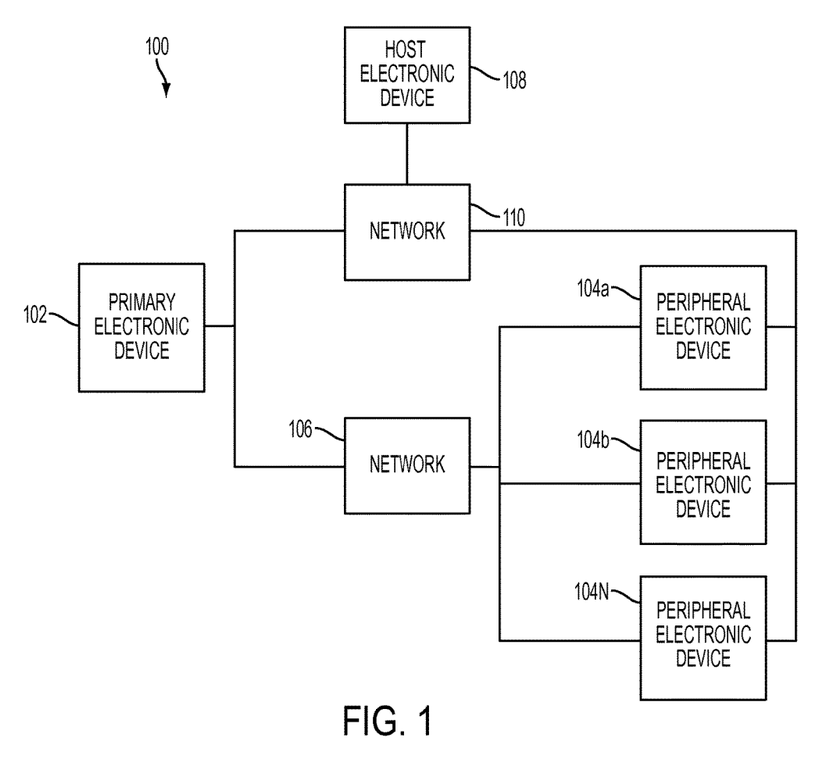
FIG. 1 illustrates an example system for identifying a peripheral electronic device according to an embodiment.

FIG. 1 illustrates an example system 100 for identifying a peripheral electronic device according to an embodiment. As illustrated by FIG. 1, a system 100 may include a primary electronic device 102, one or more peripheral electronic devices 104a-N, and a host electronic device 108. The primary electronic device 102 may be in communication with one or more of the peripheral electronic devices 104a-N via one or more networks 106. In various embodiments, a primary electronic device 102 and/or one or more peripheral electronic devices 104a-N may be in communication with a host electronic device 108 via one or more networks 110. A network 106, 110 may be a local area network (LAN), a wide area network (WAN), a mobile or cellular communication network, an extranet, an intranet, the Internet and/or the like.

In certain embodiments, a primary electronic device 102 may be used to distinguish between peripheral electronic devices 104a-N. A primary electronic device 102 may distinguish between peripheral electronic devices 104a-N to cause a particular peripheral electronic device to perform an action. For instance, a primary electronic device 102 may access, modify and/or update one or more settings of one or more peripheral electronic devices 104a-N. For example, a user may access a dashboard or other user interface of a primary electronic device 102 to access, modify and/or update one or more settings of a peripheral electronic device 104a-N. For instance, a user may access a dashboard on the user's laptop computer to update settings of the user's tablet and mobile device. As another example, a user may access a dashboard on the user's tablet to update settings of the user's laptop computer and desktop computer.

As another example, a primary electronic device 102 may distinguish between peripheral electronic devices 104a-N in order to cause content, such as for example, a movie, to be displayed on a particular peripheral electronic device. In another example, a primary electronic device 102 may distinguish between peripheral electronic devices 104a-N in order to cause digital rights management (DRM) content to be displayed by or accessed by a peripheral electronic device.

In yet another example, a primary electronic device 102 may want to distinguish between peripheral electronic devices 104a-N to remotely install an application or other software on one peripheral electronic device, to delete an application or other software from one peripheral electronic device, to remotely wipe a peripheral electronic device, to remotely lock a peripheral electronic device, to remotely shut down a peripheral electronic device, and/or to remotely access a sensor, such as, for example, a camera or a microphone, of a peripheral electronic device. Additional and/or alternate actions may be taken within the scope of this application.

Each peripheral electronic device 104a-N of a user may be associated with a user account of the user. So, as part of this process, a user may be required to identify the peripheral electronic device 104a-N for which an action is to be taken.

Figure 2:
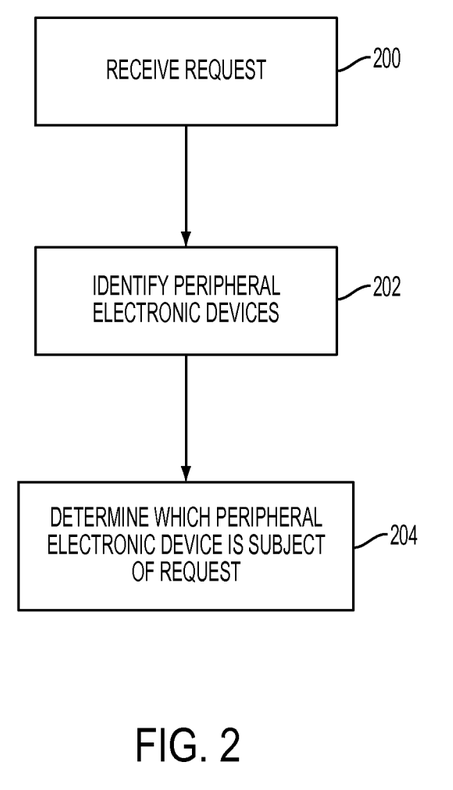
FIG. 2 illustrates an example method of identifying a peripheral electronic device according to an embodiment.

FIG. 2 illustrates an example method of identifying a peripheral electronic device according to an embodiment. As illustrated by FIG. 2, a primary electronic device may receive a request to identify a peripheral electronic device. In certain embodiments, a primary electronic device may receive 200 a request from a user to identify a certain peripheral electronic device associated with the user or a user account of the user.

The primary electronic device may identify 202 one or more peripheral electronic devices. A primary electronic device may identify 202 one or more peripheral electronic devices by determining one or more peripheral electronic devices associated with a user or a user account. In another embodiment, a primary electronic device may identify 202 one or more peripheral electronic devices that are within a certain range of the primary electronic device.

Figure 3:
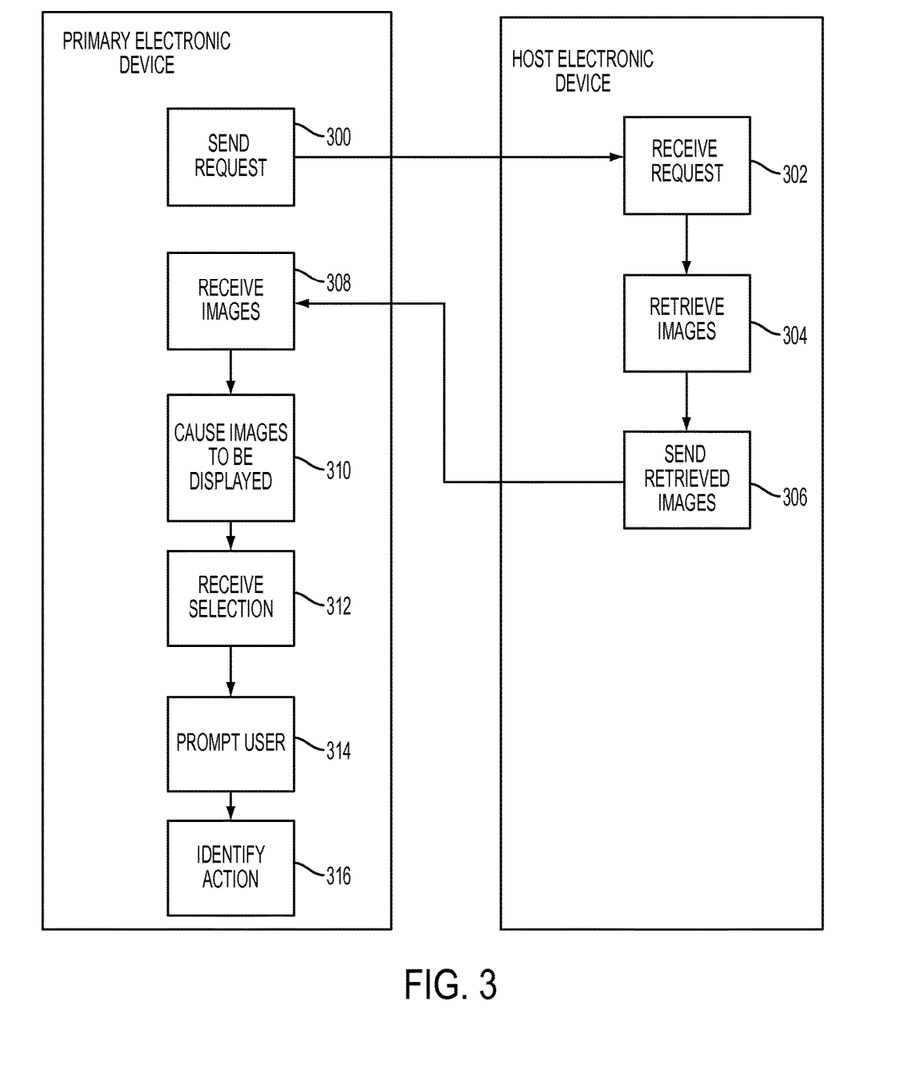
FIGS. 3-7 illustrate example methods of determining which of the identified peripheral electronic devices is the subject of a received request according to various embodiments.

In an embodiment, the primary electronic device may determine 204 which of the identified peripheral electronic devices is the subject of the received request. A primary electronic device may determine 204 which of the identified peripheral electronic devices is the subject of the received request in a variety of ways. As illustrated by FIG. 3, a primary electronic device may determine 204 which of the identified peripheral electronic devices is the subject of the received request by sending 300 a request to a host electronic device. The request may include an indication of the corresponding user account.

The host electronic device may receive 302 the request and may retrieve 304 one or more images associated with one or more peripheral electronic devices associated with the user account. An image may be a background image of a peripheral electronic device. A background image may be an image that is used as a background of a graphical user interface on a peripheral electronic device. For example, a background image may be that which is displayed on a desktop of a computer or that which is displayed on the home screen of a mobile device.

In certain embodiments, an image may be an image of an application or widget layout of a peripheral electronic device. The arrangement, location or grouping of how applications or widgets are displayed to a user on a peripheral electronic device may be customizable by the user. As such, this layout may be used to uniquely identify a peripheral electronic device.

In certain embodiments, a peripheral electronic device may send one or more images to a host electronic device. For instance, when a user changes a background image of a peripheral electronic device, or updates the user's application or widget layout, the peripheral electronic device may send an image corresponding to the new background image and/or the new layout to a host electronic device. In other embodiments, a peripheral electronic device may send one or more images to a host electronic device at certain times, such as, for example, once a day. The host electronic device may store the received image, and may associate the received image with the corresponding user account.

A host electronic device may send 306 one or more retrieved images to the primary electronic device. The primary electronic device may receive 308 the one or more retrieved images, and may cause 310 one or more of the received images to be displayed. For example, a primary electronic device may cause 310 one or more of the received images to be displayed as thumbnail images to a user. The user may select the displayed image that corresponds to the peripheral electronic device of interest, and the primary electronic device may receive 312 the selection. In response to receiving 312 the selection, the primary electronic device may prompt 314 a user to identify 316 an action to take with respect to the selected peripheral electronic device. An action may include, for example, updating or changing one or more settings of the peripheral electronic device, and/or the like. Other actions may include, without limitation, causing content, such as for example, a movie, to be displayed on a particular peripheral electronic device, causing DRM content to be displayed by or accessed by a peripheral electronic device, remotely installing an application or other software on one peripheral electronic device, deleting an application or other software from one peripheral electronic device, remotely wiping a peripheral electronic device, remotely locking a peripheral electronic device, remotely shutting down a peripheral electronic device, and/or remotely accessing a sensor, such as, for example, a camera or a microphone, of a peripheral electronic device.

In various embodiments, a user may be notified that certain images, such as an application layout or a background image, from the user's peripheral electronic device or devices may be stored and associated with the user's account, and later used to help the user identify the user's peripheral electronic device. If the user prefers that one or more images from the user's peripheral electronic device not be stored or associated with the user's account or used to help the user identify the peripheral electronic device, the user may be provided with the opportunity to express this preference, either on an image-by-image basis, or with respect to images as whole. For instance, a peripheral electronic device may ask a user for permission to use, store or associate one or more images before any action is taken. If the user does not grant permission for such a use, then the corresponding image or images may not be used to determine whether the peripheral electronic device is the subject of a received request.

Figure 4:
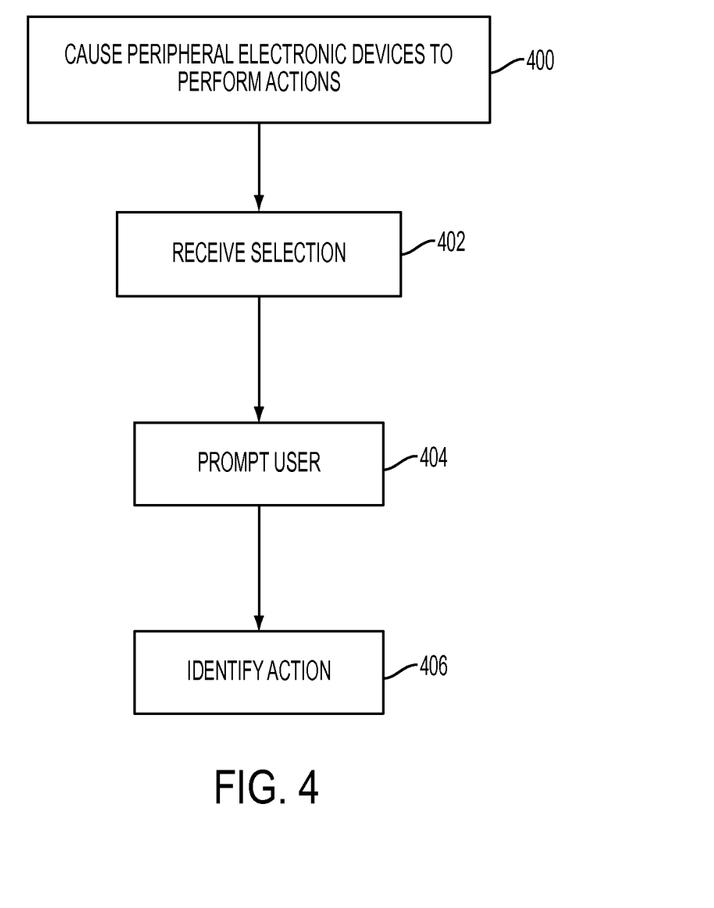

FIG. 4 illustrates another example method of determining 204 which of the identified peripheral electronic devices is the subject of the received request according to an embodiment. As illustrated by FIG. 4, a primary electronic device may cause 400 one or more of the identified peripheral electronic devices to perform one or more actions. For example, the primary electronic device may cause 400 a peripheral electronic device to vibrate, make one or more sounds, display one or more images, cause one or more lights of a peripheral electronic device to light or blink, and/or the like.

In certain embodiments, a primary electronic device may cause 400 a peripheral electronic device to perform one or more actions for a period of time or until a selection of the peripheral electronic device is received, whichever occurs first. In certain embodiments, a primary electronic device may receive 402 a selection of a peripheral electronic device in response to the peripheral electronic device performing one or more actions. For example, a primary electronic device may cause 400 a peripheral electronic device to vibrate. If the vibrating peripheral electronic device is the peripheral electronic device that is the subject of the request, the primary electronic device may receive 402 a selection or other indication from the user. For instance, a primary electronic device may receive 402 a selection of an icon, a picture, a name, an image and/or another representation of the peripheral electronic device performing the action from the user.

As an example, a primary electronic device may cause 400 a peripheral electronic device to vibrate for a period of ten seconds or until a selection of the peripheral electronic device is received by the primary electronic device.

In an embodiment, a primary electronic device may continue to cause 400 identified peripheral electronic devices to perform one or more actions until the primary electronic device receives a selection of one of the peripheral electronic devices. For instance, a primary electronic device may detect three peripheral electronic devices associated with a user: two tablets and a mobile phone. The user may want to change settings for the mobile phone. The primary electronic device may cause 400 one of the tablets to vibrate. Because the tablet is not the device of interest to the user, the user may allow the tablet to vibrate for the allocated period of time, for example, ten seconds.

If the primary electronic device does not receive a selection of a peripheral electronic device during the period of time during which the peripheral electronic device performs an action, the primary electronic device may cause 400 another peripheral electronic device to perform an action. In this example, the primary electronic device may cause 400 the other tablet to make a beeping sound.

Because the other tablet is not the device of interest to the user, the user may allow the other tablet to sound for the allocated period of time, for example, ten seconds. The primary electronic device may then cause 400 a light of the mobile electronic device to blink. Because the mobile electronic device is the device of interest to the user, the primary electronic device may receive 402 a selection of the mobile electronic device from the user. For example, a user may select an icon that is displayed by the primary electronic device and that represents the mobile electronic device in order to identify the mobile electronic device as the device of interest to the user. The mobile electronic device may receive 402 the selection.

In response to receiving 402 the selection, the primary electronic device may prompt 404 a user to identify 406 an action to take with respect to the selected peripheral electronic device.

Figure 5:
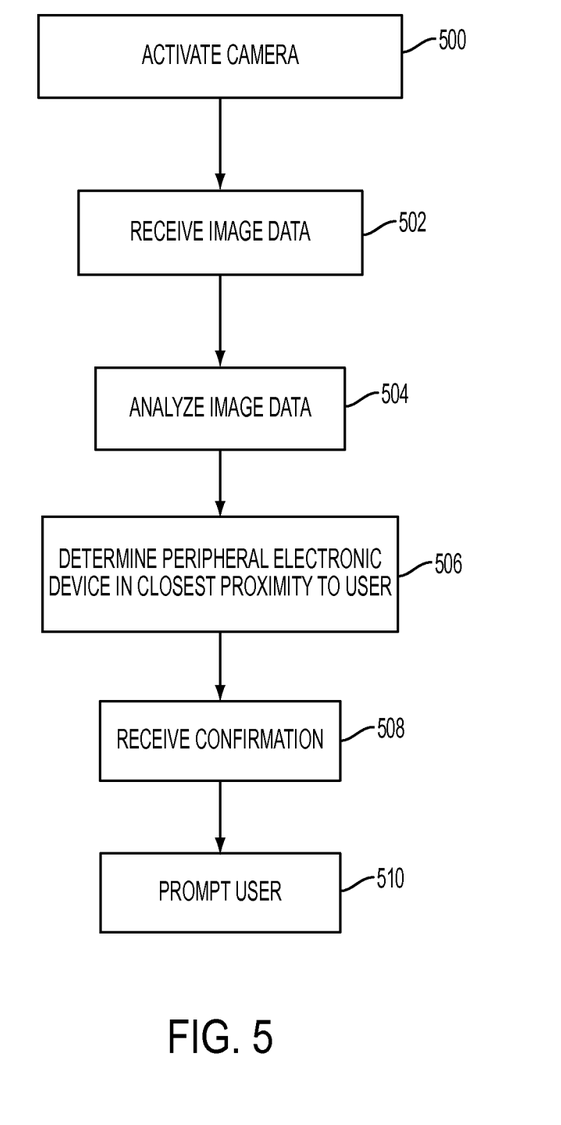

FIG. 5 illustrates another example method of determining 204 which of the identified peripheral electronic devices is the subject of the received request according to an embodiment. As illustrated by FIG. 5, a primary electronic device may activate 500 a camera associated with the primary electronic device. The primary electronic device may receive 502 image data from the camera. In an embodiment, the primary electronic device may analyze 504 the image data to identify a peripheral electronic device that is in closest proximity to the user. The primary electronic device may determine 506 that the peripheral electronic device that is in closest proximity to the user is the peripheral electronic device that is the subject of the received request. In certain embodiments, the primary electronic device may cause a representation of the peripheral electronic device that is in closest proximity to the user to be displayed to the user. The primary electronic device may receive 508 confirmation from the user that the peripheral electronic device that is in closest proximity to the user is the peripheral electronic device that is the subject of the received request. The primary electronic device may prompt 510 a user to identify an action to take with respect to the identified peripheral electronic device.

In various embodiments, a user may be notified before a camera is activated, and may be given the opportunity to prevent the camera from being activated if desired. For instance, a peripheral electronic device may inform a user that the camera of the peripheral electronic device is about to be activated, and may ask the user for permission to activate the camera. If the user does not grant permission for such a use, then the camera may not be activated.

Figure 6:
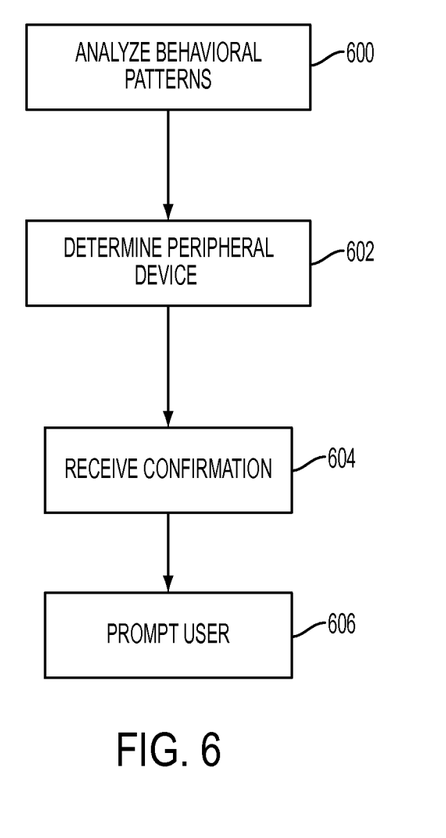

FIG. 6 illustrates another example method of determining 204 which of the identified peripheral electronic devices is the subject of the received request according to an embodiment. As illustrated by FIG. 6, a primary electronic device may analyze 600 one or more behavioral patterns associated with one or more of the identified peripheral electronic devices to determine 204 which of the identified peripheral electronic devices is the subject of the received request. A behavioral pattern associated with a peripheral electronic device may include, for example, a frequency of use of the peripheral electronic device, a usage time associated with one or more applications, widgets or other software programs of a peripheral electronic device, a time of day during which a peripheral electronic device is used, and/or the like. For example, a primary electronic device may discern from the types of applications being accessed on a peripheral electronic device whether the peripheral electronic device is the device that is the subject of the received request.

In certain embodiments, a primary electronic device may discern from the time of day what peripheral devices is the subject of the received request. For example, a user may have one mobile phone for work and one mobile phone for personal user. If a user requests that one or more settings be changed on the user's mobile phone during the day on a weekday, the primary electronic device may discern that the peripheral electronic device that is the subject of the request is the user's work mobile phone. However, if the user requests that one or more settings be changed on the user's mobile phone on a weekend day, the primary electronic device may discern that the peripheral electronic device that is the subject of the request is the user's personal mobile phone.

In certain embodiments, the primary electronic device may use the results of its analysis to determine 602 which of the identified peripheral electronic devices it believes is the subject of the request. In certain embodiments, the primary electronic device may cause a representation of the determined peripheral electronic device to be displayed to the user. The primary electronic device may receive 604 confirmation from the user that the determined peripheral electronic device is the peripheral electronic device that is the subject of the received request. The primary electronic device may prompt 606 a user to identify an action to take with respect to the identified peripheral electronic device.

In various embodiments, a user may be notified that one or more of the user's behaviors or behavioral patterns with respect to a peripheral electronic device may be used to later identify the user's peripheral electronic device. If the user prefers that one or more behaviors or behavioral patterns not be used, the user may be provided with the opportunity to express this preference. For instance, a peripheral electronic device may ask a user for permission to use or access one or more behavioral patterns before any action is taken. If the user does not grant permission for such a use, then the corresponding behaviors or behavioral patterns may not be used to determine whether the peripheral electronic device is the subject of a received request.

Figure 7:
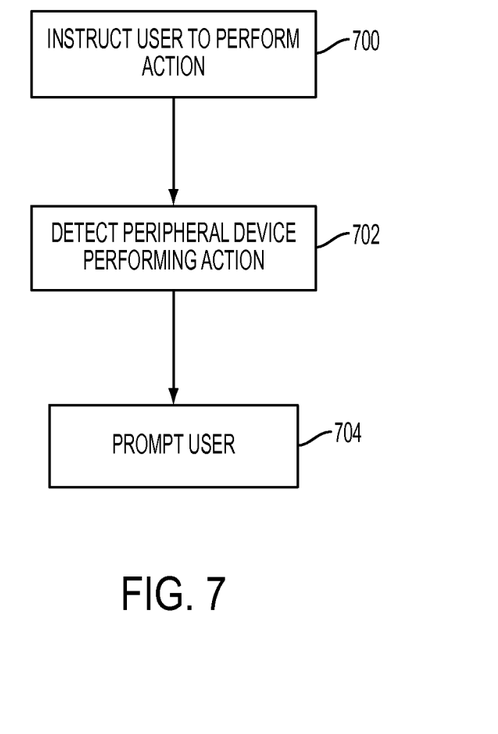

FIG. 7 illustrates another example method of determining 204 which of the identified peripheral electronic devices is the subject of the received request according to an embodiment. As illustrated by FIG. 7, a primary electronic device may instruct 700 a user to perform an action using the desired peripheral electronic device. In certain embodiments, a primary electronic device may instruct 700 a user to perform an action by displaying one or more instructions to a user, speaking one or more instructions to the user and/or the like. An action may involve providing one or more inputs to a peripheral electronic device such as, for example, pressing one or more buttons of the desired peripheral electronic device, tapping a touch screen of the desired peripheral electronic device and/or the like. In certain embodiments, an action may involve a specified motion, such as moving a peripheral electronic device such as, for example, by shaking the device, swinging the device, moving the device back and forth, knocking or tapping on the peripheral electronic device, spinning the peripheral electronic device, flipping the peripheral electronic device over one or more times and/or the like. Other examples may include moving a peripheral electronic device in a certain pattern or in a motion to form a certain shape or design such as, for example, a square, a circle, a wave, a triangle, an ellipse and/or the like.

In various embodiments, an action may involve prompting a user to perform a certain action with respect to the peripheral electronic device. For example, a primary electronic device may prompt a user to draw a pattern on or using a peripheral electronic device, prompt a user to smile or wink into a camera of a peripheral electronic device or prompt a user to enter a particular input, such as a number, into a peripheral electronic device. Additional and/or alternate actions may be used within the scope of this disclosure.

In an embodiment, a primary electronic device may detect 702 which identified peripheral electronic device is performing the instructed action. The primary electronic device may determine that the peripheral electronic device that is performing the instructed action is the peripheral electronic device that is the subject of the request. The primary electronic device may prompt 704 a user to identify an action to take with respect to the desired peripheral electronic device.

In various embodiments, one or more combinations of techniques, such as those described above with respect to FIGS. 3-7, may be used to determine 204 which of the identified peripheral electronic devices is the subject of the received request according to an embodiment. For example, a primary electronic device may activate a camera to determine which peripheral electronic devices are within proximity of the user, and may analyze one or more behavioral patterns associated with each peripheral electronic device that is in proximity to the user to determine which of those devices is the subject of the received request.

As another example, a primary electronic device may use information from one or more sensors of a peripheral electronic device in conjunction with one or more behavioral patterns to identify a peripheral electronic device. For example, a primary electronic device may use information from a barometer of a peripheral electronic device to discern that the peripheral electronic device is located approximately three stories above ground. If a request is made during working hours of a weekday, the primary electronic device may discern that the request pertains to the user's work peripheral device and not the user's personal peripheral device because it is likely given the time of day and the location of the peripheral electronic devcie that the user is currently at work. Additional and/or alternate combinations may be used within the scope of this disclosure.

Figure 8:
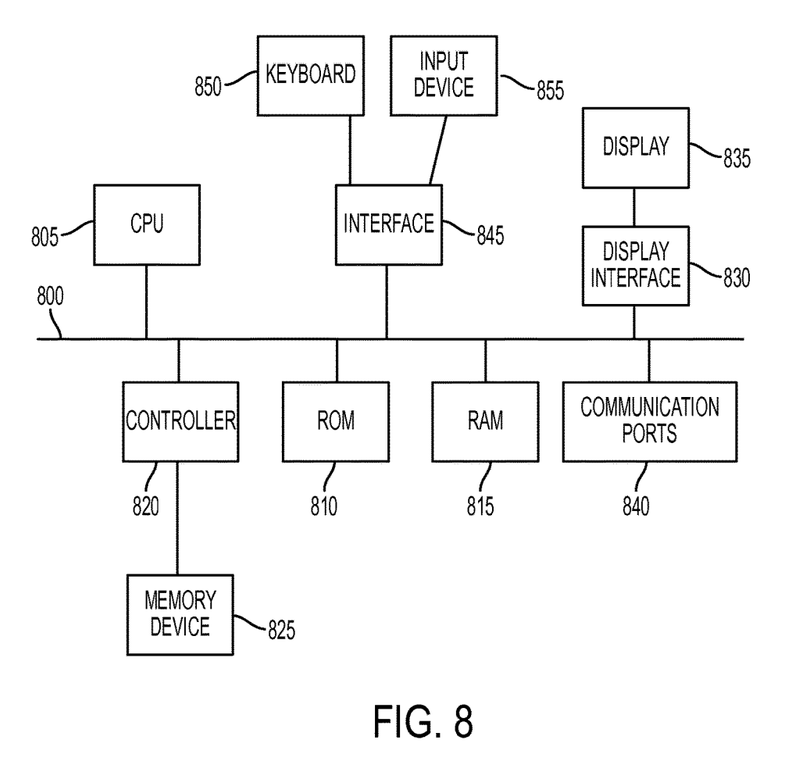
FIG. 8 illustrates a block diagram of example hardware that may be used to contain or implement program instructions according to an embodiment.

FIG. 8 depicts a block diagram of hardware that may be used to contain or implement program instructions. A bus 800 serves as the main information highway interconnecting the other illustrated components of the hardware. CPU 805 is the central processing unit of the system, performing calculations and logic operations required to execute a program. CPU 805, alone or in conjunction with one or more of the other elements disclosed in FIG. 8, is an example of a production device, computing device or processor as such terms are used within this disclosure. Read only memory (ROM) 810 and random access memory (RAM) 815 constitute examples of non-transitory computer-readable storage media.

A controller 820 interfaces with one or more optional non-transitory computer-readable storage media 825 to the system bus 800. These storage media 825 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 810 and/or the RAM 815. Optionally, the program instructions may be stored on a tangible, non-transitory computer-readable medium such as a compact disk, a digital disk, flash memory, a memory card, a USB drive, an optical disc storage medium and/or other recording medium.

An optional display interface 830 may permit information from the bus 800 to be displayed on the display 835 in audio, visual, graphic or alphanumeric format. Communication with external devices, such as a printing device, may occur using various communication ports 840. A communication port 840 may be attached to a communication network, such as the Internet or an intranet.

The hardware may also include an interface 845 which allows for receipt of data from input devices such as a keyboard 850 or other input device 855 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method of differentiating between at least two peripheral electronic devices, the method comprising, by a primary electronic device:
   receiving a request from a user to identify a desired peripheral electronic device associated with the user;
   identifying a plurality of peripheral electronic devices associated with the user;
   receiving an image associated with each of the identified peripheral electronic devices, wherein each image comprises a background image of a graphical user interface of the associated identified peripheral electronic device and uniquely identifies the associated identified peripheral electronic device;
   displaying one or more of the received images as a prompt to the user to select the image associated with the peripheral electronic device desired by the user;
   receiving a selection of one of the displayed images;
   identifying the peripheral electronic device associated with the selected displayed image as the desired peripheral electronic device; and
   causing an action to be taken with respect to the identified peripheral electronic device.

2. The method of claim 1, wherein receiving an image comprises receiving, from a host electronic device, an image of a layout of one or more applications of the peripheral electronic device, wherein the layout is customizable by the user.

3. The method of 1, wherein identifying a plurality of peripheral electronic devices associated with the user comprises identifying a plurality of peripheral electronic devices associated with a user account of the user.

4. A method of differentiating between at least two peripheral electronic devices, the method comprising, by a primary electronic device:
   receiving a request from a user to identify a desired peripheral electronic device associated with the user;
   identifying a plurality of peripheral electronic devices associated with the user;
   causing one or more of the identified peripheral electronic devices to perform one or more actions, the one or more actions comprising a vibration of one or more of the identified peripheral electronic devices as a prompt to the user to select a desired peripheral electronic device;
   in response to causing one or more of the identified peripheral electronic devices to perform one or more actions, receiving from the user a selection of a representation associated with one of the identified peripheral electronic devices, wherein the representation comprises a background image of a graphical user interface of the associated identified peripheral electronic device;
   identifying the peripheral electronic device associated with the selected representation as the desired peripheral electronic device; and
   causing a second action to be taken with respect to the identified peripheral electronic device.

5. The method of claim 1, wherein the action comprises:
   allowing the identified peripheral electronic device to display or access digital rights management contents;
   remotely installing software on the identified peripheral electronic device;
   deleting software from the identified peripheral electronic device;
   updating or changing one or more settings of the identified peripheral electronic device;
   remotely wiping the identified peripheral electronic device;
   remotely locking the identified peripheral electronic device;
   remotely shutting down the identified peripheral electronic device; or
   remotely accessing a sensor of the identified peripheral electronic device.

6. The method of claim 4, wherein causing one or more of the identified peripheral electronic devices to perform one or more actions comprises causing the peripheral electronic device to vibrate.

7. The method of claim 4, wherein causing one or more of the identified peripheral electronic devices to perform one or more actions comprises causing the peripheral electronic device to make a sound.

8. The method of claim 4, wherein causing one or more of the identified peripheral electronic devices to perform one or more actions comprises causing the peripheral electronic device to display an image.

9. The method of claim 4, wherein causing one or more of the identified peripheral electronic devices to perform one or more actions comprises causing one or more lights of the peripheral electronic device to blink.

10. The method of claim 4, wherein causing one or more of the identified peripheral electronic devices to perform one or more actions comprises:
    causing a first peripheral electronic device from the identified peripheral electronic devices to perform a first action for a first period of time; and
    if the selection has not been received by expiration of the first period of time, causing a second peripheral electronic device to perform a second action for a second period of time.

11. A method of differentiating between at least two peripheral electronic devices, the method comprising, by a primary electronic device:
    receiving a request from a user to identify a desired peripheral electronic device associated with the user;
    identifying a plurality of peripheral electronic devices associated with the user;
    activating a camera associated with the primary electronic device;
    receiving image data from the camera;
    analyzing the image data to determine which of the identified peripheral electronic devices is in closest proximity to the user;
    causing an image associated with the peripheral electronic device that is in closest proximity to the user to be displayed to the user as a prompt to the user to select the image associated with the peripheral electronic device in closest proximity to the user, wherein the image comprises a background image of a graphical user interface of the peripheral electronic device;
    receiving a selection of the displayed image;
    identifying the peripheral electronic device that is in closest proximity to the user as the desired peripheral electronic device; and
    causing an action to be taken with respect to the desired peripheral electronic device.

12. The method of 11, wherein identifying a plurality of peripheral electronic devices associated with the user comprises identifying a plurality of peripheral electronic devices associated with a user account of the user.

13. A method of differentiating between at least two peripheral electronic devices, the method comprising, by a primary electronic device:

receiving a request from a user to identify a desired peripheral electronic device associated with the user;
identifying a plurality of peripheral electronic devices associated with a user;
analyzing one or more behavioral patterns associated with each of the identified peripheral electronic devices, wherein the one or more behavioral patterns comprise a usage time associated with one or more applications, widgets or other software programs of one or more of the identified peripheral electronic devices;
selecting one of the identified peripheral electronic devices as the desired peripheral electronic device based on the analysis;
displaying an image associated with the desired peripheral electronic device alerting the user of the selection, the image comprises a background image of a graphical user interface of the desired peripheral electronic device and uniquely identifies the desired peripheral electronic device; and
causing an action to be taken with respect to the desired peripheral electronic device.

14. The method of claim 13, wherein analyzing one or more behavioral patterns associated with each identified peripheral electronic device further comprises analyzing one or more of the following:
a frequency of use of the peripheral electronic device over one or more time periods; or
a frequency of use of one or more applications of the peripheral electronic device.

15. A method of differentiating between at least two peripheral electronic devices, the method comprising, by a primary electronic device:
receiving a request from a user to identify a desired peripheral electronic device associated with the user;
identifying a plurality of peripheral electronic devices associated with the user;
instructing the user to perform an action using the desired peripheral electronic device, wherein the action is moving the desired peripheral electronic device according to a specified motion, wherein the specified motion comprises one or more of the following:
shaking the desired peripheral electronic device,
swinging the desired peripheral electronic device,
moving the desired peripheral electronic device back and forth,
knocking the desired peripheral electronic device,
tapping the desired peripheral electronic device,
spinning the desired peripheral electronic device, or
flipping the desired peripheral electronic device;
detecting which of the plurality of peripheral electronic devices performs the action;
identifying the peripheral electronic device that performs the action as the desired peripheral electronic device;
displaying an image associated with the desired peripheral electronic device alerting the user of the identification, the image comprises a background image of a graphical user interface of the desired peripheral electronic device and uniquely identifies the desired peripheral electronic device; and
causing an action to be taken with respect to the identified peripheral electronic device.

16. The method of claim 15, wherein instructing the user to perform an action using the desired peripheral electronic device further comprises instructing the user to provide one or more inputs to the peripheral electronic device.

17. The method of 15, wherein identifying a plurality of peripheral electronic devices associated with the user comprises identifying a plurality of peripheral electronic devices associated with a user account of the user.

18. A system of differentiating between at least two peripheral electronic devices, the system comprising:
a primary electronic device; and
a computer-readable storage medium in communication with the primary electronic device, wherein the computer-readable storage medium comprises one or more programming instructions that, when executed, cause the primary electronic device to:
receive a request from a user to identify a desired peripheral electronic device associated with the user,
identify a plurality of peripheral electronic devices associated with the user,
receive an image associated with each of the identified peripheral electronic devices, wherein each image, wherein the image comprises a background image of a graphical user interface of the associated identified peripheral electronic device and uniquely identifies the associated identified peripheral electronic device,
display one or more of the received images as a prompt to the user to select the image associated with the peripheral electronic device desired by the user,
receive a selection of one of the displayed images,
identify the peripheral electronic device associated with the selected displayed image as the desired peripheral electronic device, and
cause an action to be taken with respect to the identified peripheral electronic device.

19. The system of claim 18, wherein the one or more programming instructions that, when executed, cause the primary electronic device to receive an image comprise one or more programming instructions that, when executed, cause the primary electronic device to receive a background image associated with the peripheral electronic device from a host electronic device.

20. The system of claim 18, wherein the one or more programming instructions that, when executed, cause the primary electronic device to receive an image comprise one or more programming instructions that, when executed, cause the primary electronic device to receive, from a host electronic device, an image of a layout of one or more applications of the peripheral electronic device, wherein the layout is customizable by the user.

21. The system of 18, wherein the one or more programming instructions that, when executed, cause the primary electronic device to identify a plurality of peripheral electronic devices associated with the user comprise one or more programming instructions that, when executed, cause the primary electronic device to identify a plurality of peripheral electronic devices associated with a user account of the user.

22. A system of differentiating between at least two peripheral electronic devices, the system comprising:
a primary electronic device; and
a computer-readable storage medium in communication with the primary electronic device, wherein the computer-readable storage medium comprises one or more programming instructions that, when executed, cause the primary electronic device to:
receive a request from a user to identify a desired peripheral electronic device associated with the user,
identify a plurality of peripheral electronic devices associated with the user,
cause one or more of the identified peripheral electronic devices to perform one or more actions, the one or more actions comprising a vibration of one or more of the identified peripheral electronic devices as a prompt to the user to select a desired peripheral electronic device, in response to causing one or more of the identified peripheral electronic devices to perform one or more actions, receive from the user a selection of a representation associated with one of the identified peripheral electronic devices, wherein the representation comprises a background image of a graphical user interface of the associated identified peripheral electronic device, identify the peripheral electronic device associated with the selected representation as the desired peripheral electronic device, and cause a second action to be taken with respect to the identified peripheral electronic device.

23. The system of claim 22, wherein the one or more programming instructions that, when executed, cause the primary electronic device to cause one or more of the identified peripheral electronic devices to perform one or more actions comprise one or more programming instructions that, when executed, cause the primary electronic device to perform one or more of the following:
vibrate;
make a sound;
display an image; and
blink one or more lights.

24. The system of claim 22, wherein the one or more programming instructions that, when executed, cause the primary electronic device to cause one or more of the identified peripheral electronic devices to perform one or more actions comprise one or more programming instructions that, when executed, cause the primary electronic device to:

cause a first peripheral electronic device from the identified peripheral electronic devices to perform a first action for a first period of time; and if the selection has not been received by expiration of the first period of time, cause a second peripheral electronic device to perform a second action for a second period of time.

25. A system of differentiating between at least two peripheral electronic devices, the system comprising:
a primary electronic device; and
a computer-readable storage medium in communication with the primary electronic device, wherein the computer-readable storage medium comprises one or more programming instructions that, when executed, cause the primary electronic device to:
receive a request from a user to identify a desired peripheral electronic device associated with the user,
identify a plurality of peripheral electronic devices associated with the user,
activate a camera associated with the primary electronic device,
receive image data from the camera,
analyze the image data to determine which of the identified peripheral electronic devices is in closest proximity to the user,
cause an image associated with the peripheral electronic device that is in closest proximity to the user to be displayed to the user as a prompt to the user to select the image associated with the peripheral electronic device in closest proximity to the user, wherein the image comprises a background image of a graphical user interface of the peripheral electronic device,
receive a selection of the displayed image,
identify the peripheral electronic device that is in closest proximity to the user as the desired peripheral electronic device, and
cause an action to be taken with respect to the desired peripheral electronic device.

26. A system of differentiating between at least two peripheral electronic devices, the system comprising:
a primary electronic device; and
a computer-readable storage medium in communication with the primary electronic device, wherein the computer-readable storage medium comprises one or more programming instructions that, when executed, cause the primary electronic device to:
receive a request from a user to identify a desired peripheral electronic device associated with the user,
identify a plurality of peripheral electronic devices associated with a user,
analyze one or more behavioral patterns associated with each of the identified peripheral electronic devices, wherein the one or more behavioral patterns comprise a usage time associated with one or more applications, widgets or other software programs of one or more of the identified peripheral electronic devices,
select one of the identified peripheral electronic devices as the desired peripheral electronic device based on the analysis,
display an image associated with the desired peripheral electronic device alerting the user of the selection, the image comprises a background image of a graphical user interface of the desired peripheral electronic device and uniquely identifies the desired peripheral electronic device; and
cause an action to be taken with respect to the desired peripheral electronic device.

27. The system of claim 26, wherein the one or more programming instructions that, when executed, cause the primary electronic device to analyze one or more behavioral patterns associated with each identified peripheral electronic device comprise one or more programming instructions that, when executed, cause the primary electronic device to analyze one or more of the following:
a frequency of use of the peripheral electronic device over one or more time periods; or
a frequency of use of one or more applications of the peripheral electronic device.

28. A system of differentiating between at least two peripheral electronic devices, the system comprising:
a primary electronic device; and
a computer-readable storage medium in communication with the primary electronic device, wherein the computer-readable storage medium comprises one or more programming instructions that, when executed, cause the primary electronic device to:
receive a request from a user to identify a desired peripheral electronic device associated with the user,
identify a plurality of peripheral electronic devices associated with the user,
instruct the user to perform an action using the desired peripheral electronic device, wherein the action is moving the desired peripheral electronic device according to a specified motion, wherein the specified motion comprises one or more of the following: shaking the desired peripheral electronic device, swinging the desired peripheral electronic device, moving the desired peripheral electronic device back and forth,
knocking the desired peripheral electronic device,
tapping the desired peripheral electronic device,
spinning the desired peripheral electronic device, or
flipping the desired peripheral electronic device,
detect which of the plurality of peripheral electronic devices performs the action,
identify the peripheral electronic device that performs the action as the desired peripheral electronic device,
display an image associated with the desired peripheral electronic device alerting the user of the identification, the image comprises a background image of a graphical user interface of the desired peripheral electronic device and uniquely identifies the desired peripheral electronic device; and
cause an action to be taken with respect to the identified peripheral electronic device.

29. The system of claim 28, wherein the one or more programming instructions that, when executed, cause the primary electronic device to instruct the user to perform an action using the desired peripheral electronic device further comprise one or more programming instructions that, when executed, cause the primary electronic device to instruct the user to provide one or more inputs to the peripheral electronic device.

* * * * *